United States Patent [19]

Dangler et al.

[11] Patent Number: 5,330,051
[45] Date of Patent: Jul. 19, 1994

[54] DIMENSIONALLY STABLE FIBERGLASS REINFORCED THERMOPLASTIC MAGNETIC TAPE DATA CARTRIDGE BODY

[75] Inventors: Robert D. Dangler, Brecksville; Frederick J. Brannan, Akron, both of Ohio

[73] Assignee: The B. F. Goodrich Company, Akron, Ohio

[21] Appl. No.: 847,540

[22] Filed: Mar. 6, 1992

[51] Int. Cl.5 .................. B32B 27/40; B65D 6/00; B65D 85/575; G11B 23/02
[52] U.S. Cl. ..................... 206/387; 360/132; 428/36.4; 428/288; 428/290; 428/423.1; 428/425.6; 220/4.23
[58] Field of Search .............. 242/197, 199; 428/34.5, 428/34.7, 36.4, 224, 288, 290, 423.1, 425.6, 425.9; 206/387, 403; 220/4.21, 4.23; 360/132

[56] References Cited

U.S. PATENT DOCUMENTS

| | | | |
|---|---|---|---|
| 3,692,255 | 9/1972 | von Behren | 242/192 |
| 3,812,960 | 5/1974 | Falletta et al. | 206/387 |
| 3,934,842 | 1/1976 | Posso | 242/199 |
| 4,166,593 | 9/1979 | Milants | 242/199 |
| 4,387,823 | 6/1983 | Shiba | 242/199 X |
| 4,667,010 | 5/1987 | Eldin | 528/125 |
| 4,674,703 | 6/1987 | Falk | 242/199 |
| 4,756,490 | 7/1988 | Newell | 242/199 |
| 4,766,511 | 8/1988 | Miyoshi et al. | 360/132 |
| 4,767,007 | 8/1988 | Oishi et al. | 206/387 |
| 4,791,484 | 12/1988 | Sasaki | 360/132 |
| 4,965,690 | 10/1990 | Tanaka et al. | 360/132 |
| 5,092,536 | 3/1992 | Gelardi et al. | 242/199 |

Primary Examiner—George F. Lesmes
Assistant Examiner—Christopher Brown
Attorney, Agent, or Firm—Helen A. Odar; Daniel J. Hudak

[57] ABSTRACT

A dimensionally stable fiberglass reinforced thermoplastic magnetic tape data cartridge case, capable of being operated by a high speed tape drive and able to endure rapid tape acceleration and deceleration without becoming warped or otherwise damaged. The cartridge case includes a fiberglass reinforced thermoplastic backplate and cover. The axles for the tape spools and other rotating components of the cartridge are preferably molded into the backplate and extend through boss circumscribed holes in the cover which provide additional dimensional stability to the cartridge.

4 Claims, 2 Drawing Sheets

DIMENSIONALLY STABLE FIBERGLASS REINFORCED THERMOPLASTIC MAGNETIC TAPE DATA CARTRIDGE BODY

FIELD OF THE INVENTION

The invention relates generally to a magnetic tape data cartridge, and more specifically to the structure and the materials of the housing for tape cartridges used in association with high speed tape drives such as those used for computer data retrieval.

BACKGROUND OF THE INVENTION

Magnetic recording tape data cartridges have long been used for recording and playing back audio, video and/or computer data. Where magnetic tape systems are used for storing data from, or retrieving data for use with a computer, it is generally highly desirable that the system be capable of handling data at very high rates, which in turn requires that the tape cartridges be designed to handle high tape speeds, and rapid acceleration and deceleration. To endure such treatment, such tape cartridges have been provided with metal backplates to which moving parts of the tape cartridge such as the tape reels and means operatively engaging the drive means of the tape recorder/player, are mounted. The metal backplate, typically aluminum, provides dimensional stability to the cartridge to prevent it from warping or otherwise becoming damaged because of the large forces applied thereto during rapid acceleration and deceleration of the tape therein. The various components of the tape cartridge are individually attached to the backplate as opposed to being integrally formed with the backplate. Consequently, such tape cartridges are complicated and expensive to make since more parts and operations are required during the assembly process than would otherwise be required if the backplate could be formed from a moldable thermoplastic or thermosetting material.

U.S. Pat. No. 3,692,255 to VonBehren discloses a magnetic tape cartridge of the kind to which the present invention pertains. Such tapes have been fabricated with aluminum backplates and a clear thermoplastic cover, and have associated with them many of the disadvantages relating to complicated and expensive assembly processes.

SUMMARY

The invention relates to a magnetic recording data cartridge having a backplate and cover fabricated from a fiber reinforced thermoplastic matrix material which is sufficiently strong to provide adequate dimensional stability to the cartridge structure to withstand rapid tape acceleration and deceleration commonly associated with tape drives used for storing and retrieving data for a computer.

In accordance with one aspect of the invention, the backplate and cover are made of a fiber reinforced polyurethane alloy or a thermoplastic molding composition which is a blend of generally immiscible thermoplastic matrix polymers which can be readily combined with reinforcing fibers to provide a molding composition useful for molding a backplate which is substantially free from shrinkage and warpage, and has very smooth, substantially fiber-free surfaces.

The dimensionally stable fiber reinforced thermoplastic backplate which is formed in a molding operation, optionally, has various features formed integrally therewith such as projecting guides for aligning the cover with the backplate during assembly, slots for receiving cooperating clips on the cover, stiffening ribs, spacing posts, etc. Spacing posts are preferably integrally formed with the cover and engage recesses or holes in the backplate to provide additional dimensional stability. The spacing posts can have snap-together type features to allow rapid assembly. The backplate is provided with pins for supporting various components such as tape reels, guide rollers, drive roller, etc., for rotation on spaced parallel axes. The pins can be straight or headed. Headed pins can, optionally, be molded in flush with the outside surface of the backplate.

The tape cartridge includes a thermoplastic cover which fits together with the backplate to form a case for housing the internal components of the cartridge. The cover is formed with appropriate cooperating holes which engage the pins of the backplate, thereby providing additional dimensional stability and eliminating the need for a stiff backplate for cantilever support of the pins. The cover is also preferably provided with clips or tabs which engage slots on the backplate.

The use of a dimensionally stable fiber reinforced backplate having various features and parts integrally formed therewith allows for the fabrication of an efficient and inexpensive magnetic tape data cartridge. The tape cartridge is easily assembled and uses fewer parts, yet has sufficient structural stability to endure the forces applied by high speed tape drives such as used with computers.

DESCRIPTION OF THE PREFERRED EMBODIMENT

Figure 1:
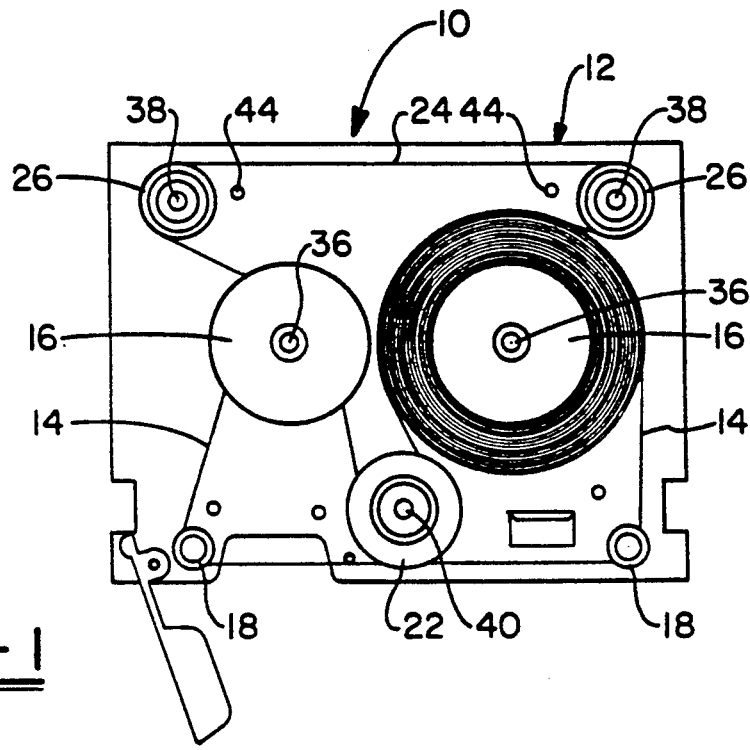
FIG. 1 is a plan view of a magnetic tape data cartridge, in accordance with the invention, with the cover of the cartridge removed.

Referring to FIG. 1, a magnetic tape data cartridge with its cover removed is generally indicated by reference numeral 10. The various components which comprise the tape cartridge 10 are mounted to a backplate 12. The tape 14 is wound around a pair of tape spools 16 with the tape traveling between the spools along a tape path defined by guides 18. An opening 20 at the front of the cover (shown in FIG. 3) permits tangential contact of drive wheel 22 with a motor driven wheel (not shown) of the tape recorder/player machine which causes rotation of the drive wheel 22 which in turn causes drive belt 24 to travel along a path defined by the drive wheel 22, a portion of the tape wound on the spools 16 and the corner wheels 26. The movement of the tape 14 is caused by movement of the drive belt 24 which positively contacts the tape 14 because of tension in the drive belt. The drive belt is typically under a tension of about 8 to 12 ounces of force with the tape tensioned at about 1 to 3 ounces of force. This type of tape drive system permits high speed tape travel with rapid acceleration and deceleration of the tape without exposing the tape to high tension, as would exist with a capstan type of drive, causing the tape to stretch or break. Additional details regarding the operation and construction of high speed belt driven tape cartridges are disclosed in U.S. Pat. No. 3,692,255 to VonBehren, which is hereby fully incorporated by reference herein.

Figure 2:
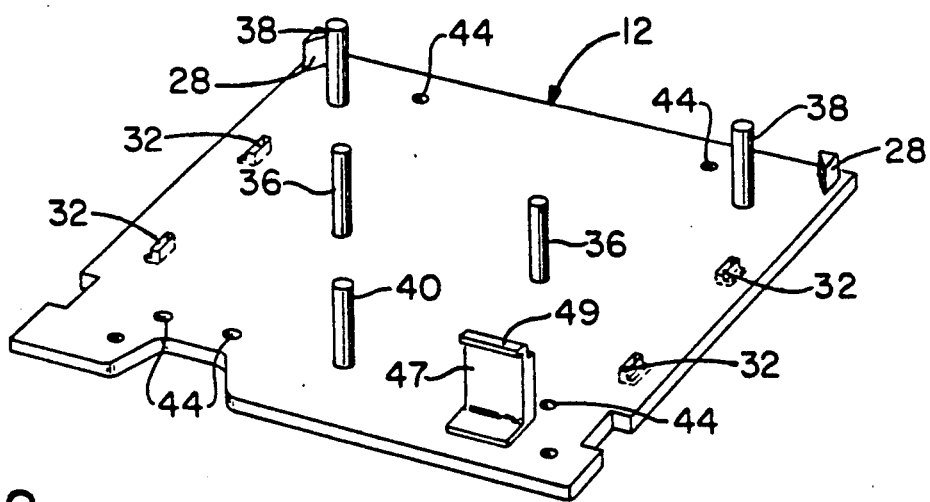
FIG. 2 is a perspective view of the magnetic tape data cartridge of FIG. 1 with components of the tape drive mechanisms removed.

A backplate 12 made of a fiber reinforced plastic matrix in accordance with the invention is shown in FIG. 2. The thickness of the backplate is preferably about 0.075 to about 0.080 inch. Guides 28 are integrally formed with the backplate and serve to guide the cover 30 (shown in FIG. 3) into proper alignment with the backplate 12 during assembly. L-shaped slots 32 receive resilient snap type clips or tabs 34 formed in the cover to permit easy snap together attachment of the cover onto the backplate. A plurality of pins including spool pins 36, corner wheel pins 38, drive wheel pin 40, and guide roller pins 42 are insert molded into the baseplate and serve as spaced parallel axles for the tape spools, the corner wheels, the drive wheel and the guide rollers, respectively. The pins are generally made of metal, with hardened steel being preferred. The pins may be straight or headed. Headed pins are preferred because they can be molded in flush with the outside surface of the backplate 12 and dissipate heat more effectively. The thickness and diameter of the pin heads can vary, but 0.025 inch thick, 0.30 inch diameter heads work well. The backplate has small circular holes 44 which engage snap-together ends on spacer posts 46 integrally formed on the cover 30 to permit rapid snap-together assembly of the tape cartridge. The spacer posts 46 maintain proper spacing between the backplate and the cover and increase the rigidity and dimensional stability of the cartridge. A stiffening rib 47 projects upwardly from the backplate 12 and has a clip or tab 49 at its end which is received by slot 51 to provide additional rigidity and dimensional stability to the tape cartridge.

Figure 3:
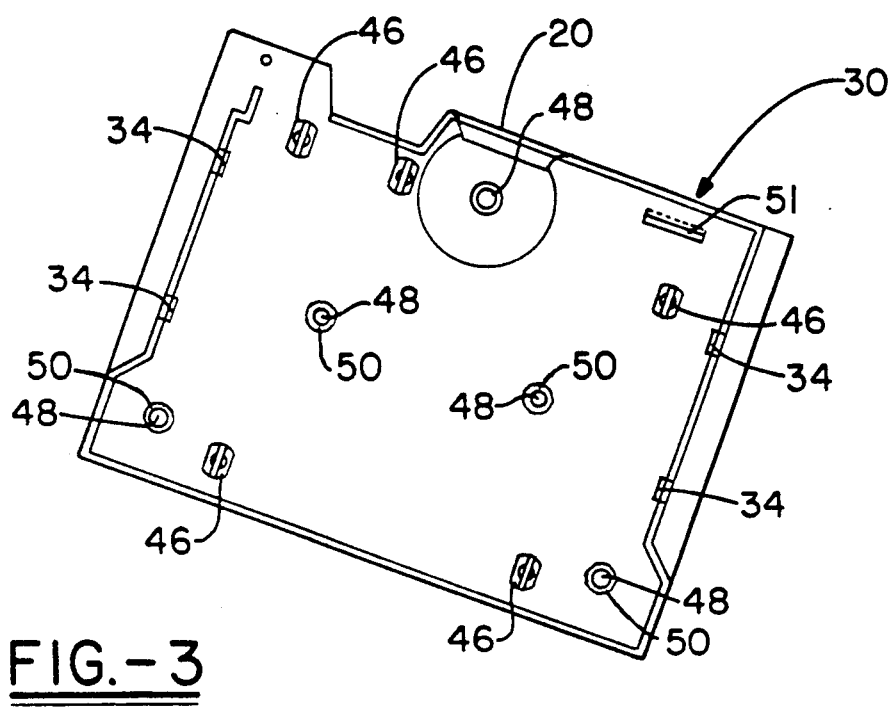
FIG. 3 is a plan view of the cover of the magnetic tape data cartridge of FIGS. 1 and 2, with the cover turned over to show the internal components of the cartridge which are integrally attached to the cover.

The cover 30, shown in FIG. 3 is formed of a plastic material with fiber reinforced polyurethane alloy or preferably an immiscible thermoplastic polyurethane blend. A preferred alloy material is Estaloc TM reinforced engineering thermoplastic 61060, 61080, 61083 or 61103, available from The BFGoodrich Co. A suitable thickness for the cover 30 is from about 0.050 to about 0.080 inch. The cover 30 has molded-in holes 48 through which the pins 36, 38, 40, 42, connected to the backplate, extend when the cartridge is assembled. Integrally formed bosses 50 circumscribing the holes 48 provide lateral support to the pins 36, 38, 40, 42 and thereby add dimensional stability to the assembled cartridge.

A blend of generally immiscible thermoplastic matrix polymers is particularly well suited for use as the matrix material for the backplate 12. A preferred class of one of the immiscible thermoplastic polymer components are the various thermoplastic polyurethanes described hereinbelow with the second immiscible polymer component being polyethylene terephthalate (PET), modified PET, block styrenic copolymers, polyester-ether copolymers, polyether block amides (PEBA), and ethylene propylene diene (EPDM) terpolymers. The immiscible thermoplastic polyurethane blend contains from about 15 to about 85 percent by weight of a thermoplastic polyurethane and from about 85 to about 15 percent by weight of an immiscible thermoplastic component based upon the total weight of the thermoplastic polyurethane component and immiscible thermoplastic polymer component.

Thermoplastic polyurethanes form a desired and often a preferred class of polymers. Suitable polyurethanes are prepared by reacting a polyisocyanate and one or more chain extenders with an intermediate such as a hydroxyl terminated polyester, a hydroxyl terminated polyether, a hydroxyl terminated polycarbonate ( i.e., a polycarbonate polyol), or mixtures thereof, or amine terminated polyesters, polyethers, or polycarbonates, or mixtures thereof.

A preferred class of hydroxyl terminated polyester intermediates is generally a linear polyester having a molecular weight of from about 500 to about 10,000, desirably from about 700 to about 5,000, and preferably from about 700 to about 4,200, and an acid number generally less than 0.8 and preferably less than 0.5. The molecular weight is determined by assay of the hydroxyl groups. The polyester intermediates are produced by (1) an esterification reaction of one or more glycols with one or more dicarboxylic acids or anhydrides, or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups.

The dicarboxylic acids can be aliphatic, cycloaliphatic, aromatic, or combinations thereof. Suitable dicarboxylic acids which may be used alone or in mixtures usually have a total of from 4 to 15 carbon atoms and include: succinic, glutaric, adipic, pimelic, suberic, azelaic, sebacic, dodecanoic, isophthalic, terephthalic cyclohexane dicarboxylic, and the like. Anhydrides of the above dicarboxylic acids, such as phthalic anhydride, tetrahydrophthalic anhydride, or the like, can also be utilized, with adipic acid being preferred.

The ester-forming glycols can be aliphatic, aromatic, or combinations thereof; have a total of from 2 to 12 carbon atoms; and include: ethylene glycol, propylene-1,2-glycol, 1,3-propanediol, butylene-1,3-glycol, 1,4-butanediol, 1,5-pentanediol, 1,6-hexanediol, 2,2-dimethylpropane-1,3-diol, 1,4-cyclohexanedimethanol, decamethylene glycol, dodecamethylene glycol, and the like, with 1,4-butanediol being a preferred glycol.

The above-described polyester intermediates are generally soft and often utilized in forming elastomer type thermoplastic polyurethanes. In addition to the above polyester intermediates, numerous other types of polyester intermediates known to the art and to the literatures can be utilized including those having different molecular weights and/or contain branch polyesters therein. Such other polyester intermediates naturally include polyesters which form a plastic type polyurethane thermoplastic.

It is noted that suitable polycarbonate polyols can also be utilized as an intermediate, and the same, as well as methods of preparation thereof, are disclosed in U.S. Pat. No. 4,643,949, which is hereby fully incorporated by reference. Other low molecular weight polycarbonate polyol intermediates can also be made from diols such as those set forth hereinabove, including 1,6-hexanediol, and the like, and phosgene; or by transesterification with low molecular weight carbonates such as diethyl or diphenyl carbonate. Similarly, suitable hydroxyl terminated polycaprolactones well known to the art and to the literature can also be utilized.

The hydroxyl terminated polyethers can be polyether polyols derived from a diol or polyol having a total of from 2 to 15 carbon atoms, preferably an alkyl diol or glycol which is reacted with an ether comprising an alkylene oxide having from 2 to 6 carbon atoms, typically ethylene oxide or propylene oxide, or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly(propylene glycol) comprising propylene oxide reacted with propylene glycol, poly(propylene-ethylene glycol) comprising propylene oxide and ethylene oxide reacted with propylene glycol, poly (tetramethylene ether glycol) comprising water reacted with tetrahydrofuran (PTMEG), glycerol adduct comprising glycerol reacted with propylene oxide, trimethylolpropane adduct comprising trimethylolpropane reacted with propylene oxide, pentaerythritol adduct comprising pentaerythritol reacted with propylene oxide, and similar hydroxyl functional polyethers. Polyether polyols further include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. The various polyether intermediates generally have an average molecular weight, as determined by assay of the terminal functional groups, of from about 500 to about 10,000, desirably from about 500 to about 6,000, more desirably from about 500 to about 4,000, and preferably from about 700 to about 3,000.

In addition to the above polyether type intermediates, other intermediates can be utilized known to those skilled in the art as well as to the literature such as those having different molecular weights, made from different reactants, and the like.

The intermediate, such as a hydroxyl terminated polyester, a polyether, etc., is further reacted with one or more polyisocyanates and preferably a diisocyanate along with an extender glycol, desirably in a "one-shot" process, that is, a simultaneous coreaction of the intermediate, diisocyanate, and extender glycol, to produce a moderate molecular weight linear polyurethane having a melt index of from about 0 to about 150 and preferably from about 0 to about 75 at 230° C. at 2,160 grams. The equivalent amount of diisocyanates to the total amount of hydroxyl and/or amine-containing components, that is, the hydroxyl or amine terminated polyester, polyether, etc., and chain extender glycol, is from about 0.95 to about 1.12 or even 1.20, and desirably from about 0.98 to about 1.06. Alternatively, the urethane can be made in a conventional two-step process wherein initially a prepolymer is made from the polyisocyanate and the intermediate, with the prepolymer subsequently being reacted with the chain extender glycol. The equivalent ratio of the one or more diisocyanates to the hydroxyl or amine terminated intermediate is generally a sufficient amount such that upon subsequent chain extension with a suitable glycol, the overall equivalent ratio of the hydroxyl or amine terminated compounds to the one or more polyisocyanates is approximately 0.95 to about 1.06, and the like. Often it can be an excess such as up to about 1.20 or less, or 1.15 or less. Suitable diisocyanates include non-hindered aromatic diisocyanates such as: methylene bis-phenyl isocyanate (MDI); isophorone diisocyanate (IPDI), m-xylylene diisocyanate (XDI), as well as nonhindered cyclic aliphatic diisocyanates such as 1,4-cyclohexyl diisocyanate (CHDI), decane-1,10-diisocyanate, phenylene-1,4-diisocyanate, naphthylene-1,5-diisocyanate, diphenylmethane-3,3'-dimethoxy-4,4'-diisocyanate, dicyclohexylmethane-4,4'-diisocyanate, and cyclohexyl-1,4-diisocyanate, as well as combinations thereof. The most preferred non-hindered diisocyanate is methylene bisphenyl isocyanate, i.e., MDI.

Suitable extender glycols (i.e., chain extenders) are lower aliphatic or short-chain glycols having from about 2 to about 10 carbon atoms and include, for instance, ethylene glycol, diethylene glycol, propylene glycol, dipropylene glycol, 1,4-butane diol, 1,6-hexane diol, 1,3-butane diol, 1,5-pentane diol, 1,4-cyclohexanedimethanol, hydroquinone di(hydroxyethyl)ether, diethylene glycol, neopentyl glycol, and the like, as well as cycloaliphatic and aromatic glycols, as well as combinations thereof, with 1,4-butane diol being preferred.

In the one-shot polymerization process, a simultaneous reaction occurs between three components: one or more polyol prepolymers, polyisocyanate, and extender glycol. The reaction is generally initiated at temperatures above 100° C. and desirably above 120° C. Inasmuch as the reaction is exothermic, the reaction temperature generally increases to about 200° C. to 280° C. Similar reaction temperatures are utilized when the polyurethane is made in a two-step process.

Examples of the above, as well as other suitable thermoplastic polyurethanes which can be utilized, are set forth in Vol. 13 of the *Encyclopedia of Polymer Science and Engineering*, John Wiley & Sons, Inc., New York, N.Y., 1988, pages 243–303, which is hereby fully incorporated by reference.

Another specific thermoplastic component which can be utilized is polyethylene terephthalate (PET), known to the art and to the literature, and generally made from the reaction product of ethylene glycol and dimethyl terephthalate or by direct esterification between ethylene glycol and terephthalic acid under heat and a high vacuum. Moreover, PETG polymers can also be utilized, as known to the art and to the literature, and generally are the reaction products of ethylene glycol, a short-chain glycol other than ethylene glycol, and dimethyl terephthalate or terephthalic acid. Examples of other polyesters which can be utilized are set forth in *Encyclopedia of Polymer Science and Engineering*, Vol. 12, John Wiley & Sons, Inc., New York, N.Y., 1988, pages 217–256, which is hereby fully incorporated by reference.

In another aspect of the invention, it has been discovered that surprising improved results are obtained when a modified PET is used. The modified (M-PET) is a random mixed linear thermoplastic copolyester formed by the reaction of ethylene glycol, terephthalic acid and at least one other glycol and/or dicarboxylic acid. The M-PET has an intrinsic viscosity of from about 0.4 to about 1.2 and a melting point lower than unmodified PET (which is about 265° C.). Desirably the melting point of the M-PET is from about 200° C. to about 255° C. preferably from about 225° C. to about 250° C. and most desirably from about 235° C. to about 248° C.

One or more glycols, in addition to ethylene glycol, may be used alone or in combination with one or more dicarboxylic acids, in addition to terephthalic acid. Suitable glycols and dicarboxylic acids are any glycol or diacid which is reactive to form a copolyester with PET and interrupts the crystallinity of PET sufficient to lower its melting point. Suitable glycols include aliphatic, cycloaliphatic and aromatic glycols. Aliphatic glycols include straight or branched chain alkane and alkene diols, including 1,3-propanediol; 1,4-butanediol; 1,5-pentanediol; 1,6-hexanediol; 3-methyl-1,5-pentanediol; 2,2-dimethyl-1,3-propanediol; 2-methyl-1,3-propanediol; 3-octyl-1,6-hexanediol; and cyclohexane dimethanol. Aromatics include benzene glycol and ethoxylated bis-phenol A. Polyether glycols such as diethylene glycol may also be used. Although less desirable, triols may be used. The preferred glycols are 1,5-pentanediol and 1,6-hexanediol.

Suitable dicarboxylic acids include aliphatic, straight and branched chain diacids, and aromatics. Exemplary aliphatic diacids include $C_4$ to $C_{12}$ diacids, such as adipic acid, glutaric acid, sebacic acid, azelaic acid and 1,12-dodecanedioic acid. The preferred diacids are glutaric or azaleic acid.

Typically, the aromatic dicarboxylic acids have a molecular weight less than about 500. Suitable aromatic dicarboxylic acids include isophthalic acid (m-pthalic acid), phthalic acid (o-phthalic acid), t-butyl isophthalic acid, 4,4'-dibenzoic acid, 4,4'-substituted dicarboxy compounds with two benzene nuclei such as bis(p-carboxyphenyl)methane, p-oxy(p-carboxyphenyl)benzoic acid, ethylene-bis(p-oxybenzoic acid), 1,5-naphthalene dicarboxylic acid, 2,6-naphthalene dicarboxylic acid, 4,4'-sulfonyl dibenzoic acid, and symmetrically substituted derivatives thereof, with substituents such as $C_1$–$C_4$ alkyl, halo and alkoxy groups. The preferred aromatic dicarboxylic acid is isophthalic acid.

Dicarboxylic acids may also be used which have at least one side chain extending from them. The side chains can be aliphatic or cycloaliphatic and can contain one or more oxygen atoms as an additional element but at least 2 carbon atoms must be present between oxygens. The side chains may also contain one or more double bonds and can be straight or branched chain. Any common aliphatic, cycloaliphatic or aromatic dicarboxylic acid may be utilized when substituted with the above-described side chains. The molecular weight of the dicarboxylic acid should not be above about 500 excluding the contribution of the side chain.

Specific examples of suitable long chain acids include substituted succinic acids having alkyl or alkenyl radicals of 8-22 carbon atoms in the α-position, 2-(1-dodecyloxy) terephthalic acid, 2-decyl-3-tridecyl succinic acid, 3-decyl-phthalic acid and 1-dodecyl-1-2-cyclohexane dicarboxylic acid.

The term "dicarboxylic acids" as used herein, includes equivalents of dicarboxylic acids having 2 functional carboxyl groups which perform substantially like dicarboxylic acids in reaction with glycols in forming copolyester polymers. These equivalents include esters and ester-forming derivatives, such as acid halides and anhydrides. While the molecular weight of the diacids suitable for use herein typically have a molecular weight of less than 500, the equivalent ester and ester-forming derivatives may have molecular weight above 500.

A preferred copolyester is one comprised of terephthalic acid, ethylene glycol and about 2 to 5 percent isophthalic acid, based upon the total weight of acid present. Diethylene glycol may additionally be present, in an amount of from about 1 to 4 percent of the total weight of glycol in the copolyester. Such a preferred copolyester will have an intrinsic viscosity of about 0.62 and is commercially available as TRAYTUF® PET resins from The Goodyear Tire & Rubber Company, Akron, Ohio, USA. Particularly suitable is TRAYTUF® 6254C PET resin.

Copolyesters of the invention can be prepared by conventional ester interchange and condensation reactions, as set forth in the *Encyclopedia of Polymer Science and Engineering*, Vol. 12, John Wiley & Sons, Inc., NY, N.Y., 1990 and in U.S. Pat. Nos. 4,223,126 and 3,890,279, all of which are incorporated herein by reference.

The amount of glycol, other than ethylene glycol, and/or dicarboxylic acid, other than terephthalic acid, incorporated into the copolyester is an amount sufficient to lower the melting point of an unmodified polyethylene terephthalate, and may vary depending upon the glycol and/or dicarboxylic acid. Generally, however, an amount of glycol and/or dicarboxylic acid from about 1 to about 20 percent by weight of the total copolyester is suitable. Preferably, from about 2 to about 6 percent of glycol and/or dicarboxylic acid is present.

Suitable styrenic copolymers are of the linear or A-B-A type. Basically, these are triblock polymers consisting of a soft rubber or elastomer midblock and hard thermoplastic polystyrene blocks attached to each end. These polymers fall into three basic categories and differ primarily in the type of rubber used in the midblock: styrene-butadiene-styrene (S-B-S); styrene-isoprene-sytrene (I-I-S); and styrene-ethylene/butylene-styrene (S-EB-S). Such triblock styrenic copolymers are commercially available from Shell Chemical Company (Texas, USA) as Kraton ® thermoplastic rubber D series (S-B-S and S-I-S) and G series (S-EB-S). These examples of styrenic block copolymers are set forth in the *Encyclopedia of Polymer Science and Engineering*, vol. 5, John Wiley & Sons, Inc., NY, N.Y., 1990, pp. 416–430, which is hereby fully incorporated by reference.

Another thermoplastic polymer component which can be utilized in the present invention is a polyester-ether polymer which in reality is a copolyetherester block copolymer generally comprising one or more ring containing polyester blocks as well as one or more acyclic polyether blocks. The polyester block is generally made from an aromatic containing dicarboxylic acid or diester such as terephthalic acid, dimethyl terephthalate, and the like, with a diol generally containing from about 2 to about 10 carbon atoms. The acyclic polyether is generally made from polyalkylene oxide glycols having a total of from about 3 to about 12 atoms including up to about 3 or 4 oxygen atoms with remaining atoms being hydrocarbon atoms. The polyester-ether polymers can be represented by the following formula:

-(ring containing polyester-b-acyclic polyether)$_n$.

Such polyester-ether copolymers are commercially available such as Hytrel, manufactured by DuPont, and the like, with polybutyleneterephthalate-b-poly(oxytetramethylene) block copolymer being preferred. These and other examples of other polyester-ether copolymers which can be utilized are set forth in the *Encyclopedia of Polymer Science and Engineering*, Vol. 12, John Wiley & Sons, Inc., NY, N.Y., 1988, pages 49–52, which is hereby fully incorporated by reference as well as U.S. Pat. Nos. 2,623,031; 3,651,014; 3,763,109; and 3,896,078.

Another thermoplastic polymer component which can be utilized in the present invention is a polyether block amide (PEBA). Generally, the structure of these polymers consists of regular and linear chains of rigid polyamide (nylon) block and flexible polyether blocks with the generalized formula

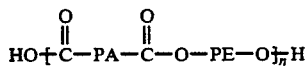

wherein PA represents the polyamide block and the PE represents the polyether block and "n" is an interger such that the polymer has a molecular weight of from about 20,000 to about 50,000. Such polyether block amide copolymers are commercially available, such as Pebax ® polyether block amide, manufactured by Atochem Inc. (New Jersey, USA).

Another thermoplastic polymer component which can be utilized in the present invention is an ethylene propylene diene (EPDM) terpolymer. The most commonly used dienes are 5-ethylidene-2-norbornene (ENB); 1,4-hexadiene (HD); and dicyclopentadiene (DCPD). Although the ratios for the monomers widely varies, most polymers contain 40–90 mol percent ethylene and 0 to 4 mol percent diene. Such EPDM terpolymers are commercially available such as Nordel ® thermoplastic rubber from DuPont and Vistalon from Exxon. These and other examples of EPDM polymers are set forth in the *Encyclopedia of Polymer Science and Engineering*, Vol. 6, John Wiley & Sons, Inc., NY, N.Y., 1990, pp. 522–563, which is hereby fully incorporated by reference.

The amount of fibers in the fiber reinforced thermoplastic matrix material is from about 5 percent to about 60 percent by weight upon the total weight of the thermoplastic polyurethane component, the immiscible thermoplastic polymer component and the fibers. The blend of materials with fibers is prepared in the presence of high shear.

Optionally, various intrinsically conductive polymers such as polyaniline, polydiphenylamine, polypyrrole, polythiophene and the like can be blended into the thermoplastic polymer composition of the cartridge casing components in amounts ranging from about 1 percent to about 25 percent to permit electrostatic dissipation of the tape cartridge. Alternatively, various conventional electrostatic dissipative additives such as metal or graphite fibers or fillers, quaternary ammonium compounds, amines, ethoxylated, propoxylated, glycerol compounds and the like can be utilized in the thermoplastic polymer composition used to form the tape cartridge casing components.

The tape cartridge case formed from the fiber reinforced thermoplastic has an exterior surface which is smooth and essentially free of fibers.

While in accordance with the Patent Statutes, the best mode and preferred embodiment has been set forth, the scope of the invention is not limited thereto, but rather by the scope of the attached claims.

What is claimed is:

1. A tape cartridge case comprising a backplate and cover both formed of a fiber reinforced thermoplastic matrix material, wherein said fiber reinforced thermoplastic matrix material contains from about 15 to about 85 percent by weight of a thermoplastic polyurethane component and from about 85 to about 15 percent by weight of an immmiscible thermoplastic polymer component based upon the total weight of the thermoplastic polyurethane component and the immiscible thermoplastic polymer component, wherein the amount of fibers in the matrix material is from about 5 percent to about 60 percent by weight based upon the total weight of the thermoplastic polyurethane component, the immiscible thermoplastic polymer component and the fibers, the matrix material being prepared in the presence of high shear, wherein said immiscible thermoplastic polymer component is PET, modified PET, a block styrenic copolymer, a polyether block amide (PEBA), a polyester-ether copolymer, or ethylene propylene diene (EPDM) terpolymers, and wherein the exterior surfaces of said case are smooth and essentially free of fibers.

2. A tape cartridge case as set forth in claim 1, further comprising a plurality of pins projecting upwards from and molded in flush with the outside surface of the backplate.

3. A tape cartridge case as set forth in claim 2, wherein said cover has a plurality of holes through which said pins, connected to the backplate, extend when the cartridge is assembled, said holes being circumscribed by bosses which provide lateral support to the pins and add dimensional stability to the assembled cartridge.

4. A tape cartridge case as set forth in claim 1, wherein the backplate is provided with slots and the cover is provided with resilient flexible clips so that the cover can be snapped onto the backplate.

* * * * *